J. R. TRIGWELL.
GEARING.
APPLICATION FILED MAY 18, 1907.

961,561.

Patented June 14, 1910.

2 SHEETS—SHEET 1.

Witnesses
David Levine

Inventor
James Richard Trigwell
by Gower Gower
Attorneys.

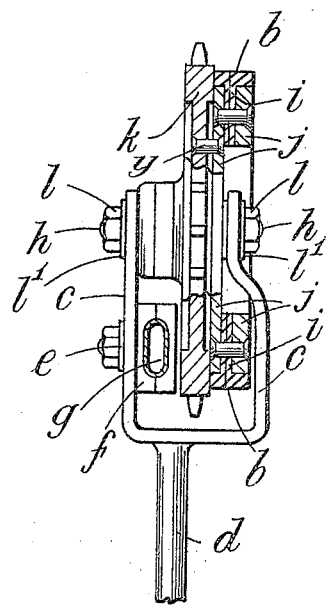

UNITED STATES PATENT OFFICE.

JAMES R. TRIGWELL, OF MITCHAM LANE, ENGLAND.

GEARING.

961,561. Specification of Letters Patent. Patented June 14, 1910.

Application filed May 18, 1907. Serial No. 374,358.

*To all whom it may concern:*

Be it known that I, JAMES R. TRIGWELL, a subject of the King of England, residing in Mitcham Lane, in the county of Surrey and Kingdom of England, have invented certain new and useful Improvements in Gearing, of which the following is a specification.

This invention relates to improvements in or connected with motor-driven velocipedes of that type in which the motor is brought into action for driving the velocipede by means of a friction disk driven by chain or the like from the engine, which disk is brought into engagement with a friction rim upon the wheel.

This invention has for its object to provide a velocipede with a motor which is adapted to be connected in an improved manner and automatically with the driving gear and disconnected therefrom by the rider at will, thereby providing a driving gear free from the motor and enabling the velocipede to be propelled by the feet of the rider acting upon the usual pedals and gearing connected therewith.

As an example I have described the invention in connection with an ordinary safety bicycle in which the rear wheel is chain driven and preferably provided with a free wheel clutch.

Figure 1:
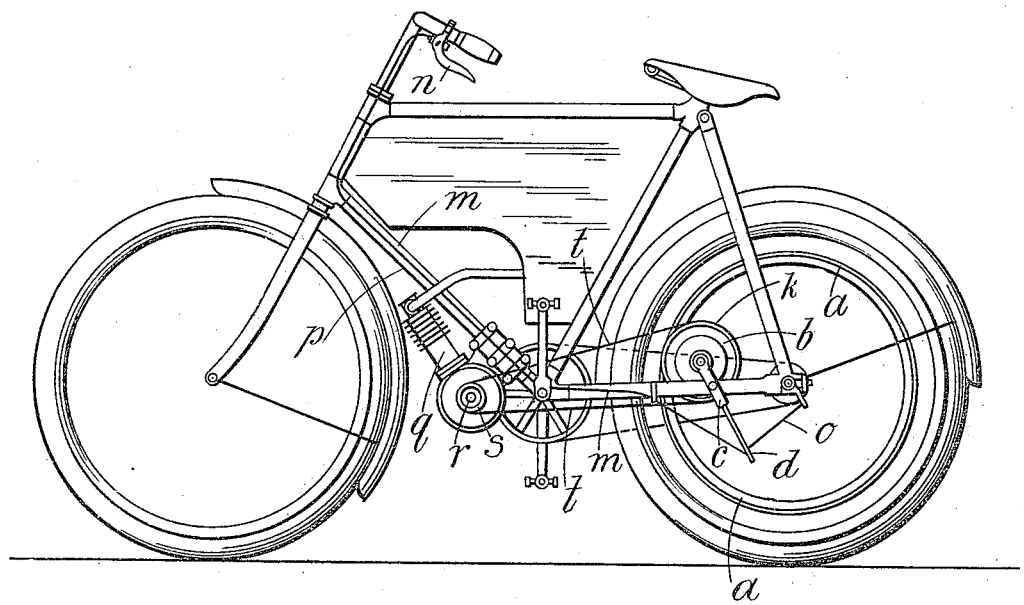
Figure 2:
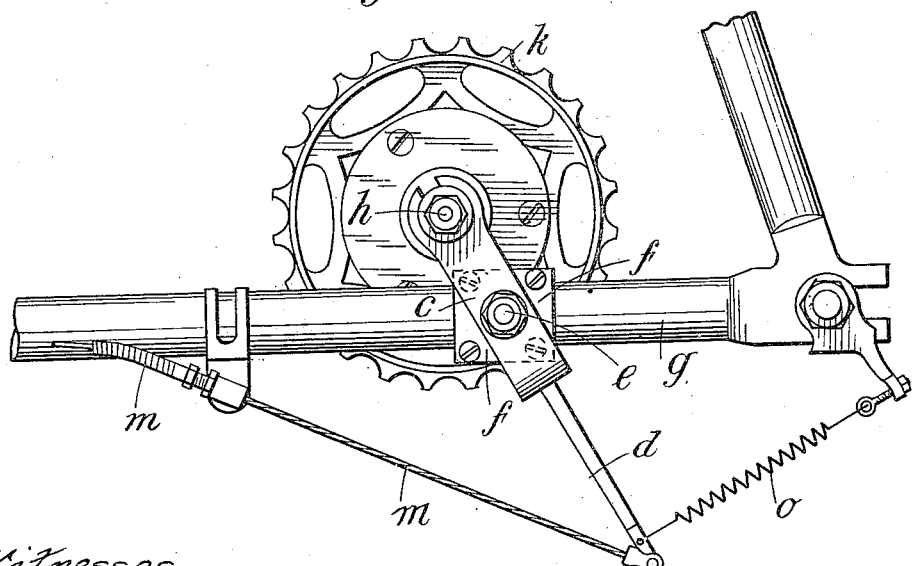

In the accompanying drawings, Figure 1 shows an elevation of an ordinary cycle fitted with the general arrangement according to my invention. Fig. 2 is an enlarged view of the driving friction disk and parts in connection therewith, while Fig. 3 is a further view partly in transverse section of such driving friction disk and parts.

Referring to the drawings, upon the rear wheel of the bicycle is mounted a friction ring $a$ which may be identical with those used with flat belts in motor cycles and secured to the rear wheel in a similar manner.

In connection with the inner side or face of the ring $a$ is provided a driving friction disk or wheel $b$ carried by the forked end $c$ of a lever $d$; or one of the prongs of the fork $c$ might be dispensed with if so desired. Such lever $d$ is between its forked ends pivotally mounted upon a stud $e$ laterally projecting from a divided clip $f$ fixed upon one of the chain stays $g$ or frame of the bicycle. The clip $f$ carrying the forked lever is divided into two parts to enable it to be passed over the chain stay $g$ and it is connected together by screws.

The lever is formed at each prong $c$ of its fork with an open ended slot (or a perforation) to receive the spindle $h$ of the driving friction disk or wheel $b$ which is constructed of two or more disks $i$ of leather or frictional material which are clamped between two axially perforated disks or plates of metal $j$ by means of screws, rivets or bolts $y$ and upon one of said plates is secured a sprocket wheel $k$; or the latter might be employed in lieu of one of the disks or plates. The necessary cones and cups with ball bearings may be provided for the said sprocket wheel and disk. The spindle $h$ which is placed within the open ended slots of the forked lever is fixed in position by means of a nut $l$ screwing upon each end of such spindle and bearing upon the outer edges of said slots and by the cones bearing upon the opposite edges of said slots. The forked ends are recessed to receive washers $l'$ which act to keep the spindle central. If desired the spindle $h$ might be fixed with the sprocket wheel $k$ and run in ball bearings fixed with the ends of the lever.

The extermity of the lever $d$ opposite to the fork $c$ is preferably by a flexible wire such as a Bowden wire $m$ shown in the specification of United States Patent No. 609570 or any other suitable connection, fixed to a short lever $n$ or movable handle grip mounted upon the handle-bar of the steering wheel or other suitable part of the cycle. A spring $o$ attached to the forked lever adjacent and opposite to the flexible wire and fixed at its other end to the chain stay $g$ acts to keep the friction disk $b$ automatically in contact with its coacting ring $a$.

Preferably upon the down tube $p$ of the bicycle is mounted a small or other suitable motor $q$ upon the main shaft $r$ of which is fixed a sprocket wheel $s$ which by a chain $t$ is connected with the sprocket wheel $k$ upon the friction disk $b$. By these means a rider can by actuating the short lever $n$ or handle grip cause the forked lever $d$ to turn upon its axis and throw the friction disk $b$ out of gear or engagement with the friction ring $a$ and there retain it when the bicycle can be used in the ordinary manner by pedaling only, and without additional friction as the friction gearing is quite independent of the pedal gearing. Sufficient slackness is provided in the adjustment of the chain to allow of contact between the friction surfaces being broken as the distance apart required is very slight in flat surfaces.

By allowing the spring $o$ upon the end of the forked lever to act and cause the friction disk to bear with a spring pressure upon the ring $a$ the latter will be driven by the friction disk by means of the chain from the motor, and, since the pull of the motor upon the chain is in the direction in which the disk moves to engage the ring, the chain acts automatically to increase the pressure of the disk against the ring in proportion to the strength of this pull, thereby giving additional power and aiding the rider to ascend steep hills or proceed against head winds with comparative ease. Or if desired the motor alone might be run with the rider resting his feet upon the pedals in cases where circumstances permit.

It will be obvious that the invention is equally applicable to velocipedes provided with a greater number of wheels than two. If desired I might run the lever carrying the fork and holding the friction disk direct to the top tube of the frame, the length of the lever acting as sufficient spring when the friction disk is held in contact with the friction ring.

What I claim and desire to secure by Letters Patent of the United States is—

1. In a motor-driven velocipede, the combination of a motor, a transmission-chain actuated thereby, a friction driving-ring, a friction-disk adapted to contact with the internal face of the friction-ring and driven by the chain, and means for bringing the said disk out of and into contact with the internal face of said friction-ring.

2. In a motor driven velocipede, the combination of a friction ring, a sprocket wheel, a friction disk secured to said sprocket wheel and in frictional contact with said ring, said disk together with said sprocket wheel being movable toward and away from said ring, a motor having a sprocket wheel and a sprocket-chain around said sprocket wheel and pulling on the periphery of said first named sprocket wheel substantially in the direction of the motion of said disk toward said ring.

3. In a motor driven velocipede, the combination of a friction ring, a rocking arm, a friction disk and a sprocket wheel secured together and rotatably mounted on one end of said rocking arm, said rocking arm being pivotally mounted to permit said disk to be moved in the plane of said ring into and out of contact with said ring, a motor, and a sprocket chain from said motor pulling on said sprocket wheel in the direction of the movement of said disk toward said ring.

4. In a motor driven velocipede, the combination of a friction ring, a rocking arm, a friction disk and a sprocket wheel secured together and rotatably mounted on one end of said rocking arm, said rocking arm being pivotally mounted to permit said disk to be moved in the plane of said ring into and out of contact with said ring, a motor, a sprocket chain from said motor pulling on said sprocket wheel in the direction of the movement of said disk toward said ring, additional means for holding the disk in contact with said ring and means for moving said disk out of contact with said ring.

In testimony, that I claim the foregoing as my invention, I have signed my name in presence of two subscribing witnesses.

J. R. TRIGWELL.

Witnesses:
J. S. ARTHER,
E. CRESWICK.